United States Patent
Wolfs

(10) Patent No.: US 9,594,392 B2
(45) Date of Patent: *Mar. 14, 2017

(54) DEVICE FOR DISTRIBUTED MAXIMUM POWER TRACKING FOR SOLAR ARRAYS

(71) Applicant: Tigo Energy, Inc., Los Gatos, CA (US)

(72) Inventor: Peter Wolfs, Rockhampton (AU)

(73) Assignee: TIGO ENERGY, INC., Los Gatos, CA (US)

( * ) Notice: Subject to any disclaimer, the term of this patent is extended or adjusted under 35 U.S.C. 154(b) by 19 days.

This patent is subject to a terminal disclaimer.

(21) Appl. No.: 14/620,805

(22) Filed: Feb. 12, 2015

(65) Prior Publication Data

US 2015/0168984 A1 Jun. 18, 2015

Related U.S. Application Data

(63) Continuation of application No. 13/316,388, filed on Dec. 9, 2011, now Pat. No. 8,963,518, which is a
(Continued)

(30) Foreign Application Priority Data

Jul. 13, 2004 (AU) ............................... 2004903833

(51) Int. Cl.
*H02M 3/158* (2006.01)
*G05F 5/00* (2006.01)
(Continued)

(52) U.S. Cl.
CPC .................. *G05F 5/00* (2013.01); *G05F 1/67* (2013.01); *H02J 3/385* (2013.01); *H02J 7/345* (2013.01);
(Continued)

(58) Field of Classification Search
CPC .... H02J 7/34; H02J 7/345; H02J 7/35; H02M 3/158; H02M 2001/0077; G05F 1/67; G05F 5/00
See application file for complete search history.

(56) References Cited

U.S. PATENT DOCUMENTS 3,696,286 A 10/1972 Ule
4,580,090 A 4/1986 Bailey et al.
(Continued)

FOREIGN PATENT DOCUMENTS

AU 2005262278 7/2005
DE 4232356 3/1994
(Continued)

OTHER PUBLICATIONS

Wolfs, Peter, U.S. Appl. No. 13/316,388, filed Dec. 9, 2011.
(Continued)

*Primary Examiner* — Matthew Nguyen
(74) *Attorney, Agent, or Firm* — Greenberg Traurig, LLP

(57) ABSTRACT

A system for providing power from solar cells whereby each cell or cell array is allowed to produce its maximum available power and converted by an operatively connected DC/DC converter. Each cell or cell array has its own DC/DC converter. In one form the system for providing power from solar cells includes one or more solar generators wherein each of said solar generators has one to nine solar cells; a maximum power tracker operatively associated with each solar generator, each of said maximum power tracker includes a buck type DC/DC converter without an output inductor, each of said maximum power trackers are operatively connected in series with each other; an inductor operatively connected to the series connected maximum power trackers; and means for providing electrical power from the inductor to load means, wherein each of said maximum power trackers is controlled so that the opera-
(Continued)

tively associated solar generator operates at its maximum power point to extract maximum available power.

20 Claims, 14 Drawing Sheets

Related U.S. Application Data continuation of application No. 12/953,337, filed on Nov. 23, 2010, now Pat. No. 8,093,757, which is a continuation of application No. 11/571,603, filed as application No. PCT/AU2005/001017 on Jul. 12, 2005, now Pat. No. 7,839,022.

(51) Int. Cl.
*H02J 3/38* (2006.01)
*G05F 1/67* (2006.01)
*H02J 7/35* (2006.01)
*H02J 7/34* (2006.01)
*H02M 1/00* (2006.01)

(52) U.S. Cl.
CPC .............. *H02J 7/35* (2013.01); *H02M 3/158* (2013.01); *H02M 2001/0077* (2013.01); *Y02E 10/566* (2013.01); *Y02E 10/58* (2013.01); *Y10S 323/906* (2013.01); *Y10T 307/549* (2015.04); *Y10T 307/675* (2015.04); *Y10T 307/685* (2015.04); *Y10T 307/718* (2015.04)

(56) References Cited

U.S. PATENT DOCUMENTS

| | | | |
|---|---|---|---|
| 4,604,567 A | 8/1986 | Chetty | |
| 4,873,480 A | 10/1989 | Lafferty | |
| 5,027,051 A | 6/1991 | Lafferty | |
| 5,144,222 A | 9/1992 | Herbert | |
| 5,235,266 A | 8/1993 | Schaffrin | |
| 5,268,832 A | 12/1993 | Kandatsu | |
| 5,327,071 A | 7/1994 | Frederick et al. | |
| 5,483,433 A * | 1/1996 | Yang .................... | H02M 7/483 307/37 |
| 5,504,418 A | 4/1996 | Ashley | |
| 5,604,430 A | 2/1997 | Decker et al. | |
| 5,648,731 A | 7/1997 | Decker et al. | |
| 5,747,967 A | 5/1998 | Muljadi et al. | |
| 5,923,158 A | 7/1999 | Kurokami et al. | |
| 5,932,994 A | 8/1999 | Jo et al. | |
| 6,275,016 B1 | 8/2001 | Ivanov | |
| 6,448,489 B2 | 9/2002 | Kimura et al. | |
| 6,650,031 B1 | 11/2003 | Goldack | |
| 6,844,739 B2 | 1/2005 | Kasai et al. | |
| 6,894,911 B2 | 5/2005 | Telefus et al. | |
| 6,919,714 B2 | 7/2005 | Delepaut | |
| 6,984,970 B2 | 1/2006 | Capel | |
| 6,987,444 B2 | 1/2006 | Bub et al. | |
| 7,061,214 B2 | 6/2006 | Mayega et al. | |
| 7,068,017 B2 | 6/2006 | Willner et al. | |
| 7,248,946 B2 | 7/2007 | Bashaw et al. | |
| 7,256,566 B2 | 8/2007 | Bhavaraju et al. | |
| 7,259,474 B2 | 8/2007 | Blanc | |
| 7,276,886 B2 | 10/2007 | Kinder et al. | |
| 7,336,004 B2 | 2/2008 | Lai | |
| 7,378,820 B2 | 5/2008 | Liu et al. | |
| 7,394,237 B2 | 7/2008 | Chou et al. | |
| 7,462,955 B2 | 12/2008 | McNamara et al. | |
| 7,518,266 B2 | 4/2009 | Eckroad | |
| 7,518,346 B2 | 4/2009 | Prexl et al. | |
| 7,538,451 B2 | 5/2009 | Nomoto | |
| 7,545,053 B2 | 6/2009 | Yoshikawa et al. | |
| 7,560,906 B2 | 7/2009 | Liu et al. | |
| 7,595,616 B2 | 9/2009 | Prexl et al. | |
| 7,602,080 B1 | 10/2009 | Hadar et al. | |
| 7,605,498 B2 | 10/2009 | Ledenev et al. | |
| 7,719,140 B2 | 5/2010 | Ledenev et al. | |
| 7,839,022 B2 | 11/2010 | Wolfs | |
| 7,900,361 B2 | 3/2011 | Adest et al. | |
| 8,093,757 B2 | 1/2012 | Wolfs | |
| 8,102,074 B2 | 1/2012 | Hadar et al. | |
| 8,274,172 B2 | 9/2012 | Hadar et al. | |
| 8,860,241 B2 | 10/2014 | Hadar et al. | |
| 8,860,246 B2 | 10/2014 | Hadar et al. | |
| 8,963,518 B2 | 2/2015 | Wolfs | |
| 2001/0038277 A1 | 11/2001 | Burstein et al. | |
| 2004/0223351 A1 | 11/2004 | Kurokami et al. | |
| 2005/0057214 A1 | 3/2005 | Matan | |
| 2005/0057215 A1 | 3/2005 | Matan | |
| 2005/0121067 A1 | 6/2005 | Toyomura et al. | |
| 2005/0139258 A1 | 6/2005 | Liu et al. | |
| 2005/0172995 A1 | 8/2005 | Rohrig et al. | |
| 2006/0001406 A1 | 1/2006 | Matan | |
| 2006/0174939 A1 | 8/2006 | Matan | |
| 2006/0185727 A1 | 8/2006 | Matan | |
| 2007/0019613 A1 | 1/2007 | Frezzolini | |
| 2007/0211888 A1 | 9/2007 | Corcoran et al. | |
| 2007/0273351 A1 | 11/2007 | Matan | |
| 2008/0030305 A1 | 2/2008 | O'Connor | |
| 2008/0036440 A1 | 2/2008 | Garmer | |
| 2008/0097655 A1 | 4/2008 | Hadar et al. | |
| 2008/0106241 A1 | 5/2008 | Deaver et al. | |
| 2008/0121272 A1 | 5/2008 | Besser et al. | |
| 2008/0122449 A1 | 5/2008 | Besser et al. | |
| 2008/0122518 A1 | 5/2008 | Besser et al. | |
| 2008/0143188 A1 | 6/2008 | Adest et al. | |
| 2008/0150366 A1 | 6/2008 | Adest et al. | |
| 2008/0179949 A1 | 7/2008 | Besser et al. | |
| 2008/0191560 A1 | 8/2008 | Besser et al. | |
| 2008/0191675 A1 | 8/2008 | Besser et al. | |
| 2008/0303503 A1 | 12/2008 | Wolfs | |
| 2010/0127570 A1 | 5/2010 | Hadar et al. | |
| 2010/0127571 A1 | 5/2010 | Hadar et al. | |
| 2011/0025130 A1 | 2/2011 | Hadar et al. | |
| 2011/0062784 A1 | 3/2011 | Wolfs | |
| 2012/0119584 A1 | 5/2012 | Hadar et al. | |
| 2012/0146420 A1 | 6/2012 | Wolfs | |
| 2015/0028683 A1 | 1/2015 | Hadar et al. | |
| 2015/0103575 A1* | 4/2015 | Ku ......................... | H02M 7/48 363/132 |
| 2015/0214887 A1* | 7/2015 | Ben-Yaakov ........... | H02M 3/07 307/52 |
| 2015/0355667 A1* | 12/2015 | Kogo ....................... | H02J 3/14 307/52 |

FOREIGN PATENT DOCUMENTS

| | | |
|---|---|---|
| DE | 19961705 | 7/2001 |
| DE | 10136147 | 2/2003 |
| EP | 0178757 | 4/1986 |
| EP | 1388774 | 2/2004 |
| ES | 2249147 | 3/2006 |
| JP | 07016552 | 3/1995 |
| JP | 11046457 | 2/1999 |
| JP | 11103538 | 4/1999 |
| JP | 2000166097 | 4/2008 |
| WO | 03012569 | 2/2003 |
| WO | 2005069096 | 7/2005 |
| WO | 2005112551 | 12/2005 |
| WO | 2006005125 | 1/2006 |
| WO | 2010062662 | 6/2008 |
| WO | 2008097591 | 8/2008 |
| WO | 2008125915 | 10/2008 |
| WO | 2008132553 | 11/2008 |

OTHER PUBLICATIONS

Alonso, R. et al., "A New Distributed Converter Interface for PV Panels," 20th European Photovoltaic Solar Energy Conference, Barcelona, Spain, pp. 2288-2291, Jun. 6-10, 2005.
Alonso, R. et al., "Experimental Results of Intelligent PV Module for Grid-Connected PV Systems," 21st European Photovoltaic Solar

(56) References Cited

OTHER PUBLICATIONS

Energy Conference, Dresden, Germany, pp. 2297-2300, Sep. 4-8, 2006.
Basso, Tim, "IEEE Standard for Interrconnecting Distributed Resources With the Electric Power System," IEEE PES Meeting, Jun. 9, 2004.
Boostbuck.com, "The Four Boostbuck Topologies," located at http://www.boostbuck.com/TheFourTopologies.html, 2003.
Enslin, Johan H.R., et al., "Integrated Photovoltaic Maximum Power Point Tracking Converter," IEEE Transactions on Industrial Electronices, vol. 44, No. 6, pp. 769-773, Dec. 1997.
European Patent Application No. 09829487.9, Extended Search Report, Apr. 21, 2011.
Gautam, Nalin K. et al., "An Efficient Algorithm to Simulate the Electrical Performance of Solar Photovoltaic Arrays," Energy, vol. 27, No. 4, pp. 347-361, 2002.
International Patent Application No. PCT/AU2005/001017, International Search Report and Written Opinion, Aug. 18, 2005.
International Patent Application No. PCT/US2009/047734, International Search Report & Written Opinion, May 4, 2010.
International Patent Application No. PCT/US2009/062536, International Search Report & Written Opinion, Jun. 17, 2010.
International Patent Application No. PCT/US2010/029915, International Search Report and Written Opinion, Oct. 21, 2010.
Linares, Leonor et al., "Improved Energy Capture in Series String Photovoltaics via Smart Distributed Power Electronics," 24th Annual IEEE Applied Power Electronics Conference and Exposition, pp. 904-910, Feb. 15, 2009.
Nordmann, T. et al., "Performance of PV Systems Under Real Conditions," European Workshop on Life Cycle Analysis and Recycling of Solar Modules, The "Waste" Challenge, Brussels, Belgium, Mar. 18-19, 2004.
Palma, L. et al., "A Modular Fuel Cell, Modular DC-DC Converter Concept for High Performance and Enhanced Reliability," 38th IEEE Power Electronics Specialists Conference (PESC'07), pp. 2633-2638, Jun. 17, 2007.
Quaschning, V. et al., "Cost Effectiveness of Shadow Tolerant Photovoltaic Systems," Euronsun 96, pp. 819-824, Sep. 16, 1996.
Roman, Eduardo, et al., "Intelligent PV Module for Grid-Connectred PV Systems," IEEE Transactions on Industrial Electronics, vol. 53, No. 4, pp. 1066-1073, Aug. 2006.
Uriarte, S. et al., "Energy Integrated Management System for PV Applications," 20th European Photovoltaic Solar Energy Conference, Jun. 6, 2005.
Walker, G. R. et al., "Cascaded DC-DC Converter Connection of Photovoltaic Modules," 33rd IEEE Power Electronics Specialists Conference (PESC'02), vol. 1, pp. 24-29, 2002.
Walker, Geoffrey R. et al., "Cascaded DC-DC Converter Connection of Photovoltaic Modules," IEEE Transactions on Power Electronics, vol. 19, No. 4, pp. 1130-1139, Jul. 2004.

* cited by examiner

| Name of Equipment | Model | Quantity |
|---|---|---|
| Current Probe | Tektronix AM503B+TM502A | 1 |
| Voltage Probe | Tektronix P5050 | 1 |
| Oscilloscope | Tektronix DPO5034 | 1 |

FIGURE 13

| Frequency (kHz) | Input Power (mW) | Output Power (mW) | Efficiency |
|---|---|---|---|
| 2 | 520 | 510 | 98% |
| 10 | 577 | 547 | 95% |
| 20 | 506 | 471 | 93% |

FIGURE 14

DEVICE FOR DISTRIBUTED MAXIMUM POWER TRACKING FOR SOLAR ARRAYS

RELATED APPLICATIONS

The present application is a continuation application of U.S. patent application Ser. No. 13/316,388, filed Dec. 9, 2011 and entitled "Device for Distributed Maximum Power Tracking for Solar Arrays", which is a continuation application of U.S. patent application Ser. No. 12/953,337, filed Nov. 23, 2010 and issued as U.S. Pat. No. 8,093,757 on Jan. 10, 2012, which is a continuation application of U.S. patent application Ser. No. 11/571,603, filed Feb. 21, 2007 and issued as U.S. Pat. No. 7,839,022 on Nov. 23, 2010, which is a national phase application of Int. Pat. App. No. PCT/AU2005/001017, filed Jul. 12, 2005, which claims the benefit of Australian Pat. App. Ser. No. 2004903833, filed Jul. 13, 2004, the entire disclosures of which applications are incorporated herein by reference.

FIELD OF THE TECHNOLOGY

The present disclosure relates to solar cell technology and in particular to maximum power tracking converters. The present disclosure has particular but not exclusive application for use in vehicles that are at least in part electrically powered by solar cells. Reference to solar powered vehicles is by means of example only and the present disclosure has application in other areas.

BACKGROUND

A solar cell is a device able to convert incident light to electrical power. Many solar cells are typically grouped to form an array of solar cells. To collect the electrical power from the solar cells, groups of cells are either directly connected in series or in parallel. Where the cells are connected in series, they must have identical currents but if the cells are connected in parallel they must operate with identical voltages. An individual cell will produce maximum power at a unique cell voltage and current which will vary from cell to cell. The combination of voltage and current that allows a cell to produce its maximum power is termed the maximum power point. The maximum power point varies with cell illumination and temperature. Connection of the cells in series forces cells to have identical current while connection in parallel forces cells to have identical voltage. Direct connection in series or parallel results in failure to collect all the available electrical power from the solar cells in the array and at least some of the cells will operate at a condition other than at their maximum power points.

To obtain the maximum available power from a group of solar cells connected in an array or sub-array, a maximum power tracking device is used. Maximum power tracking devices are DC to DC power converters that allow an array or sub-array to operate at their maximum power point. A DC to DC converter can transform a power input at a certain voltage and current to be transformed to a DC power output at a differing voltage and current. A key feature of all maximum power trackers is a control device that determines the point of maximum power for the connected solar cells and acts to adjust the DC to DC converter performance to adjust the cell voltage or current to extract the maximum available power.

However there are a number of problems or disadvantages associated with the use of a single maximum power device to control the voltage or current of an array or sub-array of solar cells.

Where solar cells are used to power vehicles, the vehicles are usually aerodynamically designed with curved surfaces and also have limited surface area in which to mount the solar cells. Consequently arrays of cells are mounted on the curved surfaces but the variation of the angle of incidence of light on the different cells within the array on the curved surface causes variation in the available optical power. Furthermore, cells in an array may be subjected to variable light levels due to shadowing by foreign objects such as trees and buildings between the cell and the source of illumination.

Because of differences in optical illumination, cell temperatures may vary within arrays causing some cells to be hotter than other cells. Arrays may be cooled partially by air flow or by the use of a cooling fluid in an illumination concentrator system. These mechanisms however may not provide uniform cooling to all cells.

The available power from each cell within an array will vary due to the variations in illumination and temperature. In these cases, the maximum power conditions of different cells within the array will differ at any one point of time. Furthermore the maximum power conditions of some cells within the array will vary differently over time compared with others. As well these variations are not predictable. In addition changes to the maximum power conditions of cells can vary rapidly thereby requiring a relatively quick response time.

Currently maximum power tracking devices are directly electrically connected to an array of solar cells. A single maximum power tracking device is currently used to control the available power from an array of between ten to several hundred cells.

SUMMARY OF THE DESCRIPTION

It is an object to provide an alternate maximum power tracking device that overcomes at least in part one or more of the above mentioned problems or disadvantages.

The present disclosure arises from the realization that each cell at any one particular time point will have a unique maximum power point defined by a specific cell voltage and specific current at which the cell will produce its maximum available power. Furthermore the disclosure was developed from the realization that it is not possible for every cell in an array to operate at its maximum power point if the array is formed by the direct electrical interconnection of cells. With this in mind and taking advantage of recent advances in low voltage electronics, maximum power tracking devices for very small groups of directly connected cells or for single solar cells were developed to provide a solution to optimizing the electrical power from the array.

In one aspect the present disclosure broadly resides in a system for providing power from solar cells including one or more solar generators wherein each of said solar generators has one to nine solar cells;

a maximum power tracker operatively associated with each solar generator, each of said maximum power tracker includes a buck type DC/DC converter without an output inductor, each of said maximum power trackers are operatively connected in series with each other; an inductor operatively connected to the series connected maximum power trackers; and means for providing electrical power from the inductor to load means, wherein each of said maximum power trackers is controlled so that the operatively associated solar generator operates at its maximum power point to extract maximum available power.

The maximum power tracker preferably includes an energy storage capacitor and a control means for adjusting the buck type DC/DC converter duty cycle so that a connected solar generator operates at its maximum power point.

Preferably the control means makes observations of solar generator voltage, and observations of the change in energy storage capacitor voltage during the buck converter switch off time and observations of the duration of the buck converter switch off time to infer solar generator power to adjust the buck converter duty cycle to extract maximum power from the connected solar generator.

In one preferred embodiment, the switching operations of the DC/DC converter are synchronized in frequency by the use of a synchronizing signal.

Preferably each solar generator includes one solar cell. Preferably each solar generator includes one solar cell and each solar cell is connected to its own dedicated maximum power tracker so that the tracker responds to its connected solar cell.

Preferably the system uses a single inductor.

Load means includes devices that use or store the electrical power.

BRIEF DESCRIPTION OF THE DRAWINGS

In order that the present disclosure can be more readily understood and put into practical effect, reference will now be made to the accompanying drawings wherein:

FIG. 13 is a table of equipment for efficiency measurement; and

FIG. 14 is a table of converter efficiency at different frequencies.

DETAILED DESCRIPTION

Figure 1:
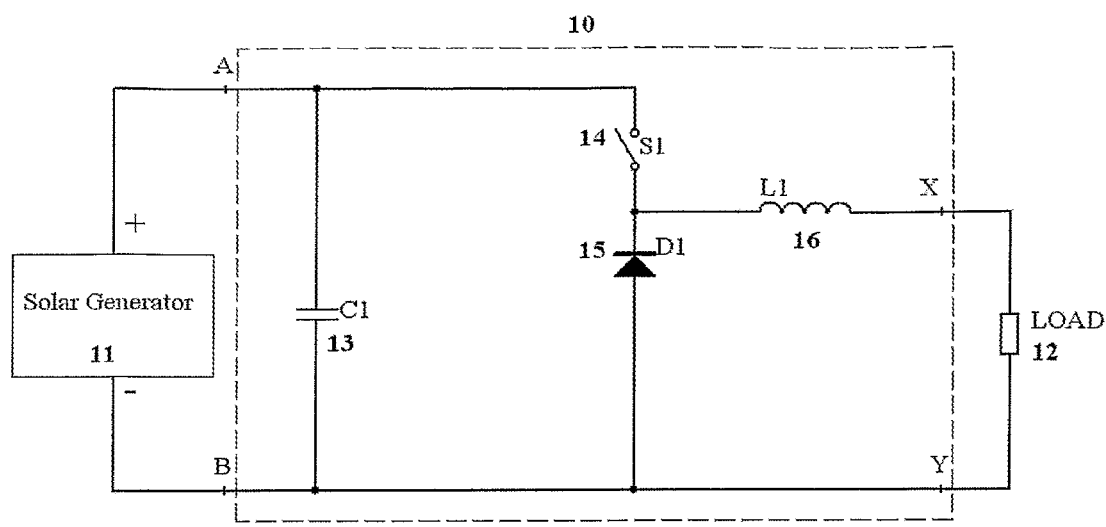
FIG. 1 is a diagrammatic view of a simplified Buck type DC/DC converter with solar generator and load.
Figure 2:
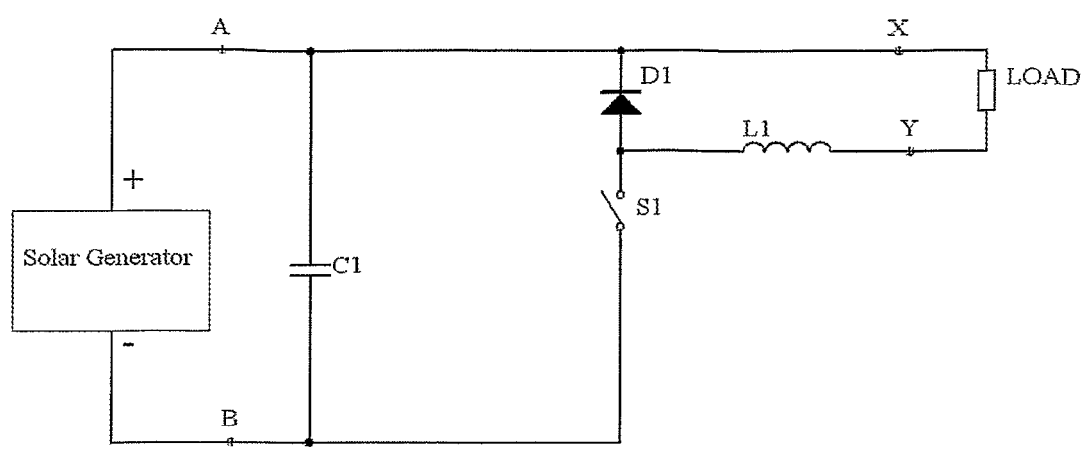
FIG. 2 is a diagrammatic view of an alternative embodiment of a simplified Buck type DC/DC converter with solar generator and load.

With reference to FIG. 1 there is shown a simplified buck type DC/DC converter 10 connected to a solar generator 11 and load 12. The solar generator 11 can be a solar cell or several cells. The buck type DC/DC converter 10 includes a capacitor 13 which serves as an energy storage element, a controlled switching device 14, a diode or a controlled device acting as a synchronous rectifier 15 and an output inductor 16. An alternative arrangement for the buck type DC/DC converter 10 is shown in FIG. 2.

A buck type DC/DC converter can be controlled to operate the solar generator at its maximum power point while producing an adjustable level of output current. The solar generator and maximum power tracker will be referred to as a solar generator/MPPT. Many solar generators/MPPT can be series connected. Each DC/DC converter will then have an identical output current but they can be individually controlled to allow each solar generator to operate at their maximum power point.

A conventional buck converter uses an output inductor to provide energy storage that is necessary for current filtering. An important feature of this disclosure is that the many inductors would normally be required, one for each solar generator/MPPT, and this can be replaced by a single inductor which will perform the energy storage and filtering function for many series connected solar generator/MPPT. The MPPT device can be produced as an inductor free device.

Figure 3:
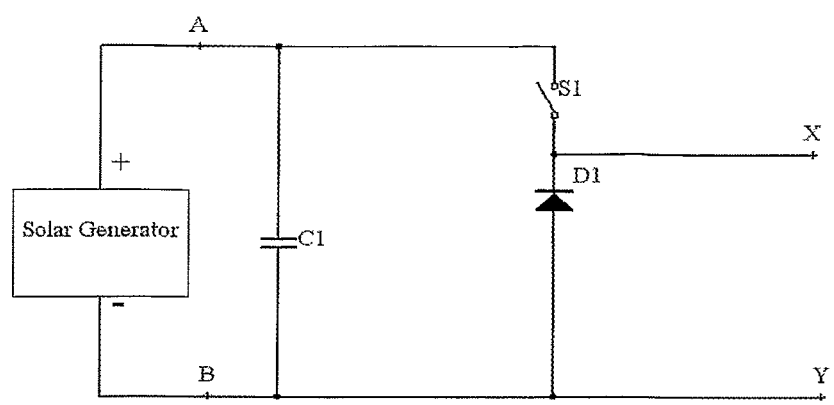
FIG. 3 is a diagrammatic view of a solar generator with a Buck type DC/DC converter without an inductor.
Figure 4:
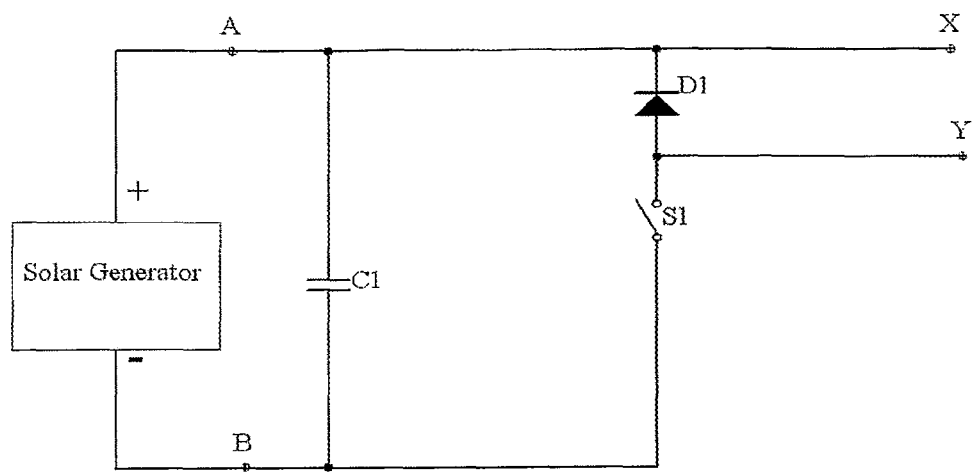
FIG. 4 is a diagrammatic view of an alternative embodiment of a solar generator with a Buck type DC/DC converter without an inductor.

FIG. 3 shows an inductorless DC/DC buck converter with a solar generator while FIG. 4 shows an alternate embodiment.

Many solar generators/MPPT devices that utilize inductor free DC/DC buck converters can be series connected with a single inductor to supply power to an electrical load. The series connection of the solar generators/MPPT devices forces each inductorless DC/DC buck converter to supply an identical output current. Each converter operates with a constant current load.

The controlled switching device operates alternates between an open and closed state. The average portion of time that the switch is closed is the switch duty cycle. Closure of the controlled switching device causes the load current to be supplied from the solar generator and the energy storage capacitor. When the controlled switch is open, the load current transfers to the diode or synchronous rectifier device while the solar generator current replenishes the charge within energy storage capacitor.

The duty cycle of the controlled switching device will determine the average current withdrawn from the energy storage capacitor. The energy storage capacitor will adjust its voltage in response to the difference in the current supplied by the solar generator and the current withdrawn to by the controlled switch. The switching device will be controlled by a device that adjusts the controlled switch duty cycle to maintain the solar generator voltage at the maximum power point.

Figure 5:
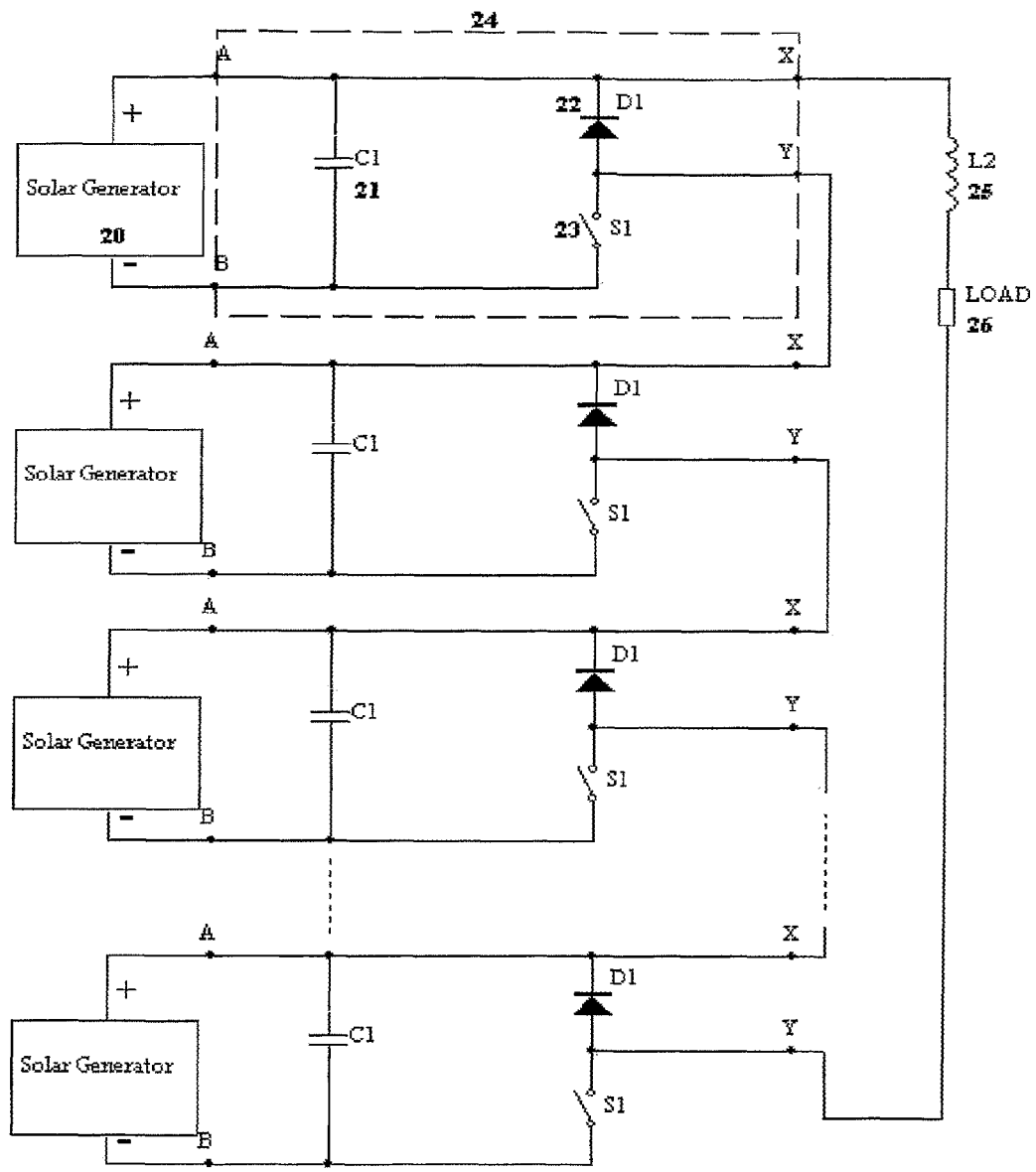
FIG. 5 is a diagrammatic view of the interconnection of a plurality of Buck type DC/DC converters without inductors, corresponding plurality of solar generators, one inductor and a load.

With respect to FIG. 5 there is shown a solar generator 20 connected to a capacitor 21, diode 22 and control switch 23. The capacitor 21, diode 22 and control switch 23 forms the inductorless DC/DC converter 24. Several solar generators 20 are connected in series via their dedicated inductorless DC/DC converters 24. Each solar generator 20 has its own inductorless DC/DC converters 24. After the last inductorless DC/DC converters 24, there is an inductor 25 to filter the current prior to reaching the load 26. The inductor 25 can be smaller in terms of magnetic energy shortage measured as $\frac{1}{2} LI^2$ where L is the inductance value in Henry and I is the inductor current, in Amperes, than the total combined set of inductors that are normally used with each buck DC/DC converter. The use of a smaller inductor and only one inductor reduces cost and weight and increases the efficiency in providing maximum power from the solar cells. In the preferred embodiment the solar generator consists of a solar generator which is a single high performance solar cell.

Figure 6:
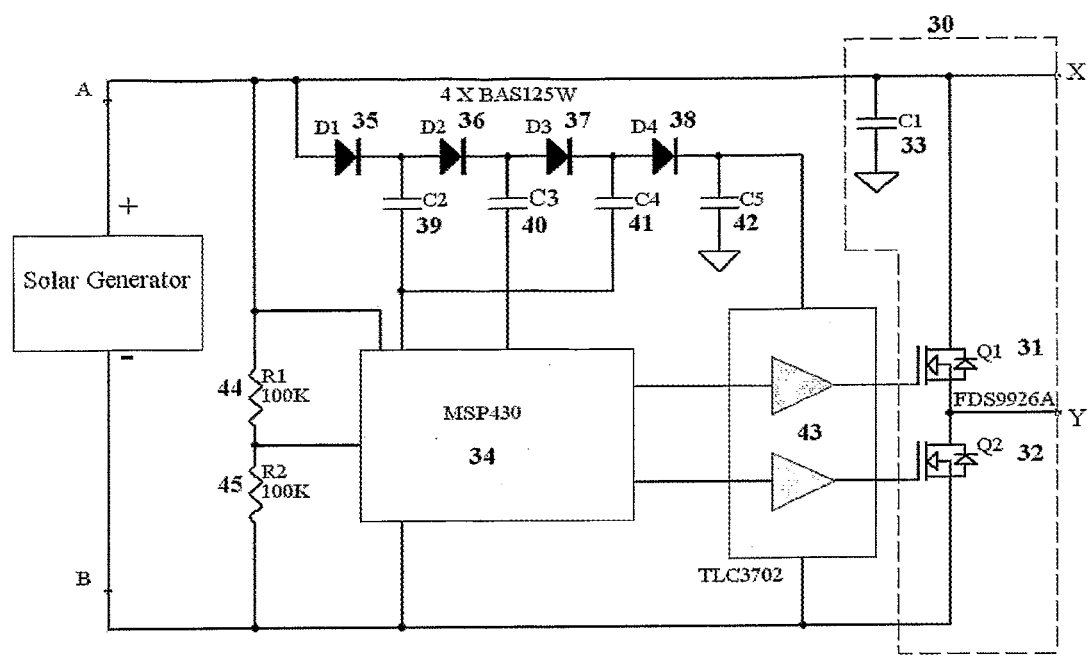
FIG. 6 is a diagrammatic view of a preferred embodiment of the single cell MPPT converter.

With reference to FIG. 6, there is shown a DC to DC converter 30 in the formed by MOSFETs Q1 and Q2 (31 and 32 respectively), and the energy storage capacitor 33. No filter inductor is required. In this preferred embodiment MOSFET Q1 (31) is a synchronous rectifier implementation of the diode device and MOSFET Q2 (32) is the buck converter controlled switch element. In the preferred embodiment the output terminals of the solar generator/MPPT device are the drain terminal of Q1, point X and the junction of the source terminal of Q1 and the drain terminal of Q2, point Y.

The control element of the maximum power device is a microprocessor. In this preferred embodiment, an ultra-low power Texas Instruments MSP430 microprocessor 34 which is capable of operation at a supply voltage of 1.8V. This allows direct operation from a dual junction cell which typically produces 2V. If other cell types are used with lower cell voltages, a power conditioning device may be required to develop a higher voltage supply to allow the control element to be operated from a single cell. For example, silicon cells typically produce 0.4V and a voltage boosting converter would be required to generate a voltage high enough to operate a microprocessor control element.

An alternate embodiment is possible where the solar generator/MPPT device output terminals are the junction of Q1 and Q2, point Y, and the source of Q2. In this case Q1 is the controlled switch element and Q2 is the diode element implemented as a synchronous rectifier.

The gate drive voltage for the MOSFETS Q1 and Q2 is derived by charge pump circuit. In the preferred implementation a multiple stage charge pump circuit formed by diodes $D_1$ to $D_4$, devices 35-38, and their associated capacitors 39-42.

The MOSFETS Q1 and Q2 are driven by a gate driver circuit. In the preferred embodiment a comparator, 43, forms the driver circuit. As this circuit delivers a higher gate to source voltage to device Q2 than Q1, Q2 achieves a lower turn on resistance. In the preferred embodiment Q2 is the controlled switching device as this arrangement minimizes power losses.

Resistors 44 and 45 form a voltage divider network which is used to perform voltage observations of solar generator voltage using a analogue to digital converter within the microprocessor 34. An important feature of the maximum power tracking method is the measurement of cell voltage magnitude, the and measurement of the change in cell voltage during periods when the controlled switch, 32, is open and the measurement of the time that the controlled switch is open to infer cell power. This may be used as an input to a maximum power tracking method that will control the DC-DC converter duty cycle to allow the solar generator to operate at maximum power.

In order to secure high efficiency in the solar generator/MPPT, low switching frequencies are preferred. In the preferred embodiment switching frequencies will be below 20 kHz. At very low switching frequencies the ripple voltage on capacitor C1 will increase. The voltage ripple will cause the cell to deviate from its maximum power point. An optimum switching frequency range will exist. In the preferred embodiments the switching frequency will be adjusted to maximize the energy delivered by the solar generator/MPPT.

A plurality of solar generator/MPPT may be configured within a large array to switch at the same frequency and with a relative phase relationship that provides improved cancellation of switching frequency voltage components in the output voltage waveforms of the solar generator/MPPT combinations. This allows a smaller inductor to provide filtering of the load current. Such synchronization may be provided by auxiliary timing signals that are distributed within an array or by other means.

In some embodiments the solar generator/MPPT devices within an array may not switch at the same frequency. The combined output voltage of large number of asynchronously switching series connected buck converters will follow a binomial distribution. The average output voltage of the group of n solar generator/MPPT devices, with an input voltage $V_{in}$ and a duty cycle d, increases linearly with n while the switching ripple or the distortion voltage, $V_{dist}$, rises as $\sqrt{n}$.

$$V_{dist} = V_{in}\sqrt{n(d-d^2)} \quad (1)$$

Likewise the average volt second area, A, for a shared filter inductor follows an $\sqrt{n}$ relationship.

$$A = \sqrt{n}\,\frac{V_{in}}{f}(d-d^2) \quad (2)$$

In a non synchronized embodiment, a larger inductor is required than in an optimally synchronized embodiment. The required inductor is still significantly smaller than the combined plurality of inductors that would be required for conventional buck converters.

A prototype converter was developed to first examine the conversion efficiency of the DC to DC converter stage and its suitability for use with a dual junction single solar cell, with an approximate maximum power point at 2V and 300 mA. For these tests the MSP340 was programmed to drive the charge pump circuitry and to operate the buck converter stage at a fixed 50% duty ratio. The experimental circuit is as in FIG. 6. A fixed 2V input source voltage was applied and a load consisting of a 2 500 µH inductor and a 1.6Ω resistor was applied. A dead-time of 0.8 µS is inserted in each turn-on and turn-off transient to prevent MOSFETs shoot through conduction events.

Figure 7:
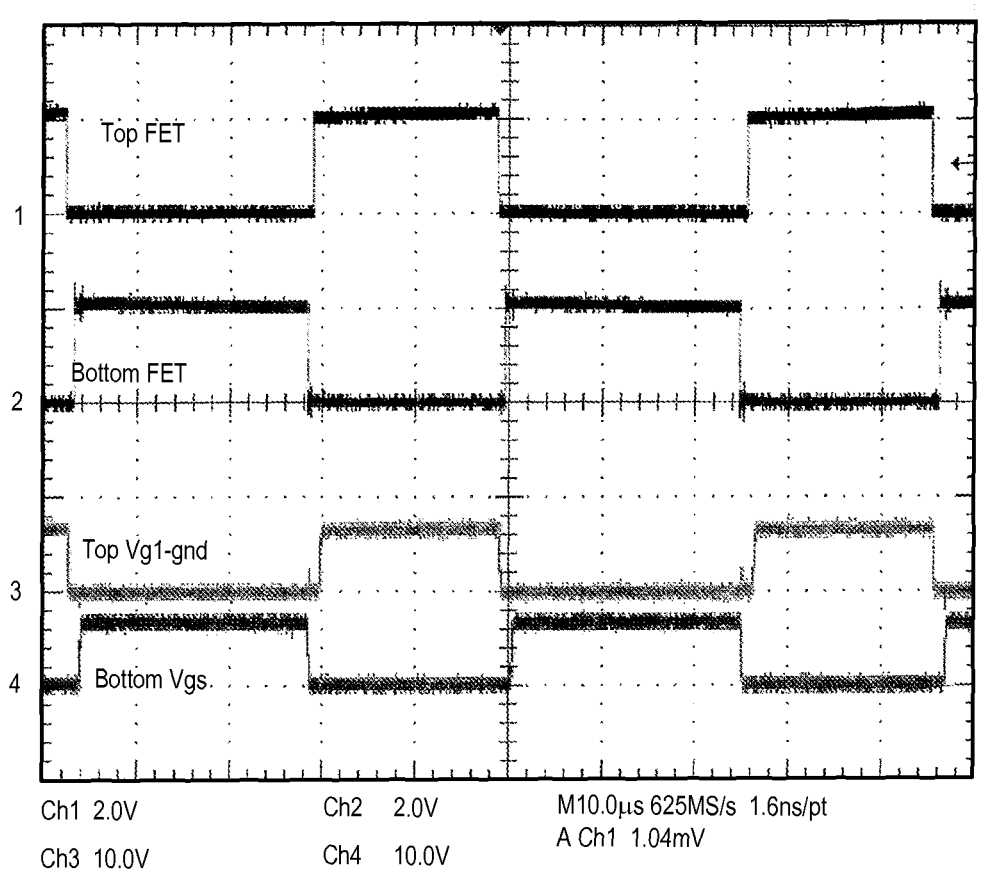
FIG. 7 is a graphical representation of the control signals and gate signals for MOSFETs.
Figure 8:
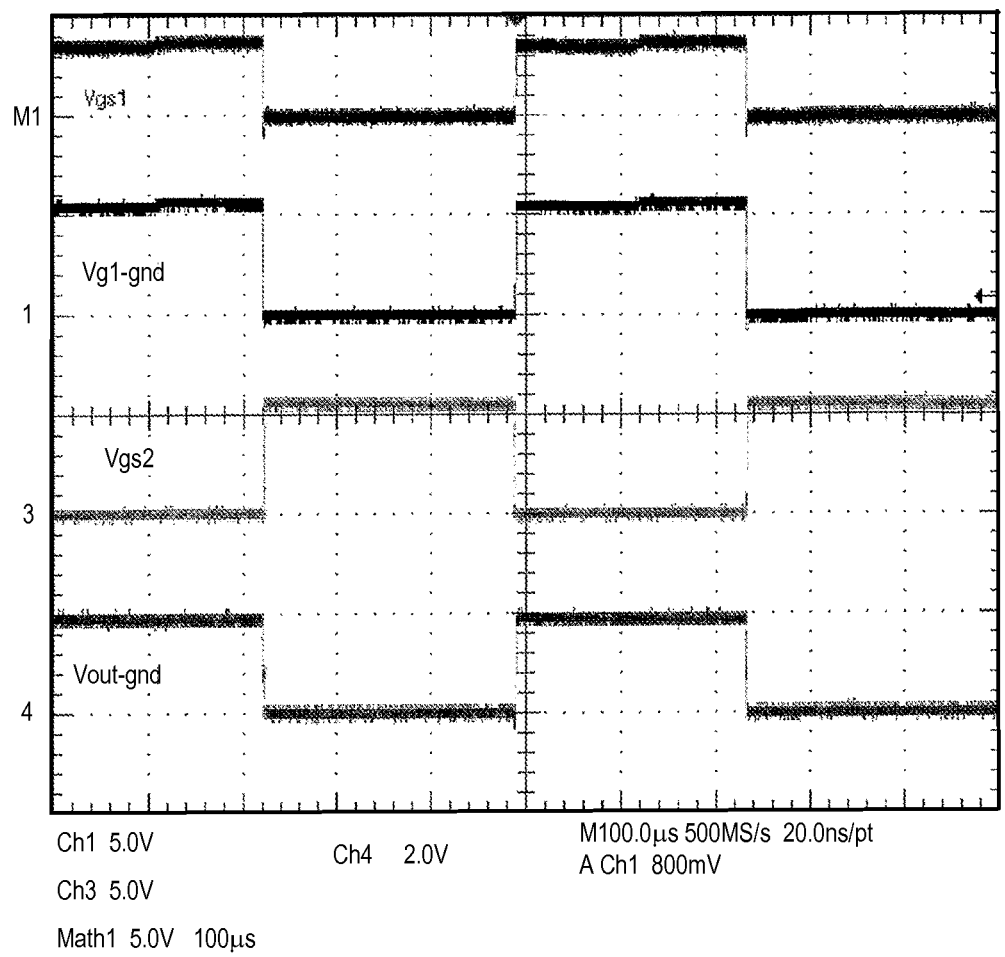
FIG. 8 is a graphical representation of a no load 2 kHz waveforms, top MOSFET gate waveform; top MOSFET gate drive referred to ground, bottom MOSFET gate waveform to ground, output terminal to ground (from top to bottom)

As gate charging loss was a significant loss contributor, a range of operating frequencies was trialled. FIG. 7 shows the control waveforms at 20 kHz. The waveforms show the dead times between the top and bottom signals at turn-on and turn-off. All waveforms in this figure are ground referred. The measured no load loss in this condition was 6 mW which is approximately twice the expected figure. The gate drive loss is fully developed at no load and we may have additional loss in the charge pump circuitry. FIG. 8 shows gate waveforms at 2 kHz but a differential measurement is made of $V_{gs1}$ to show the lowering of the gate source voltage to approximately 4V due to elevation of the source at the device turn-on.

Figure 9:
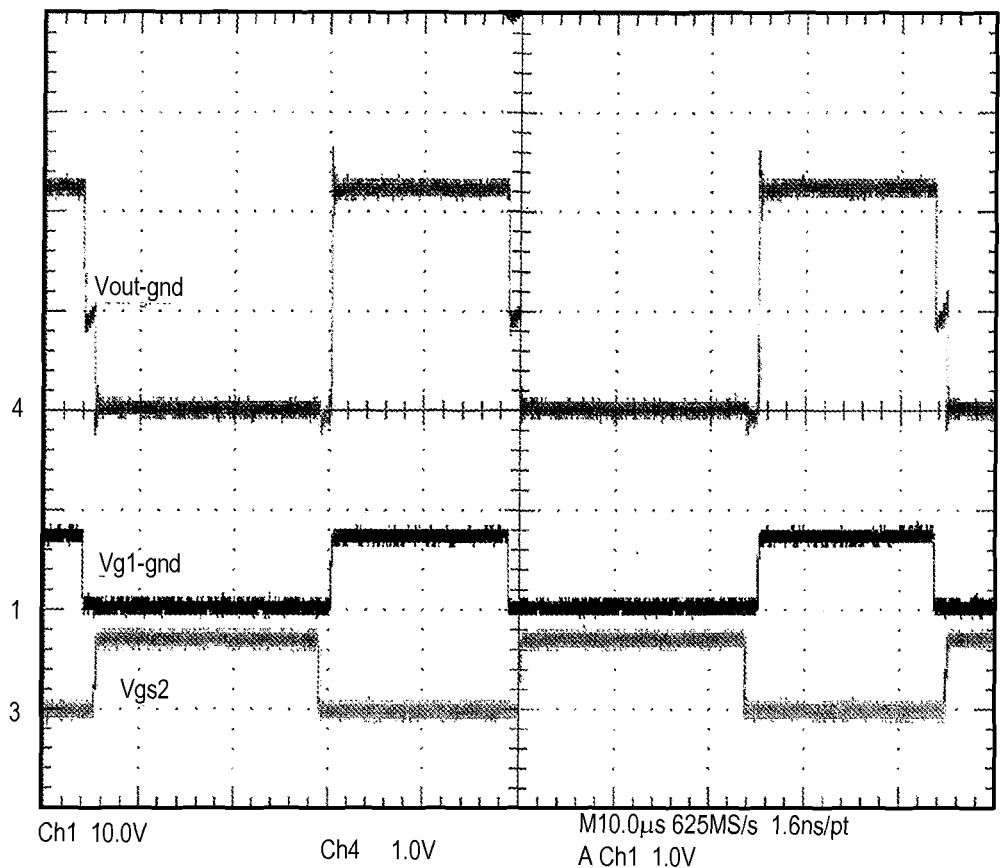
FIG. 9 is a graphical representation of an unloaded 20 kHz waveforms, Traces top to bottom, output terminal, bottom MOSFET gate, top MOSFET gate, all referred to ground.
Figure 10:
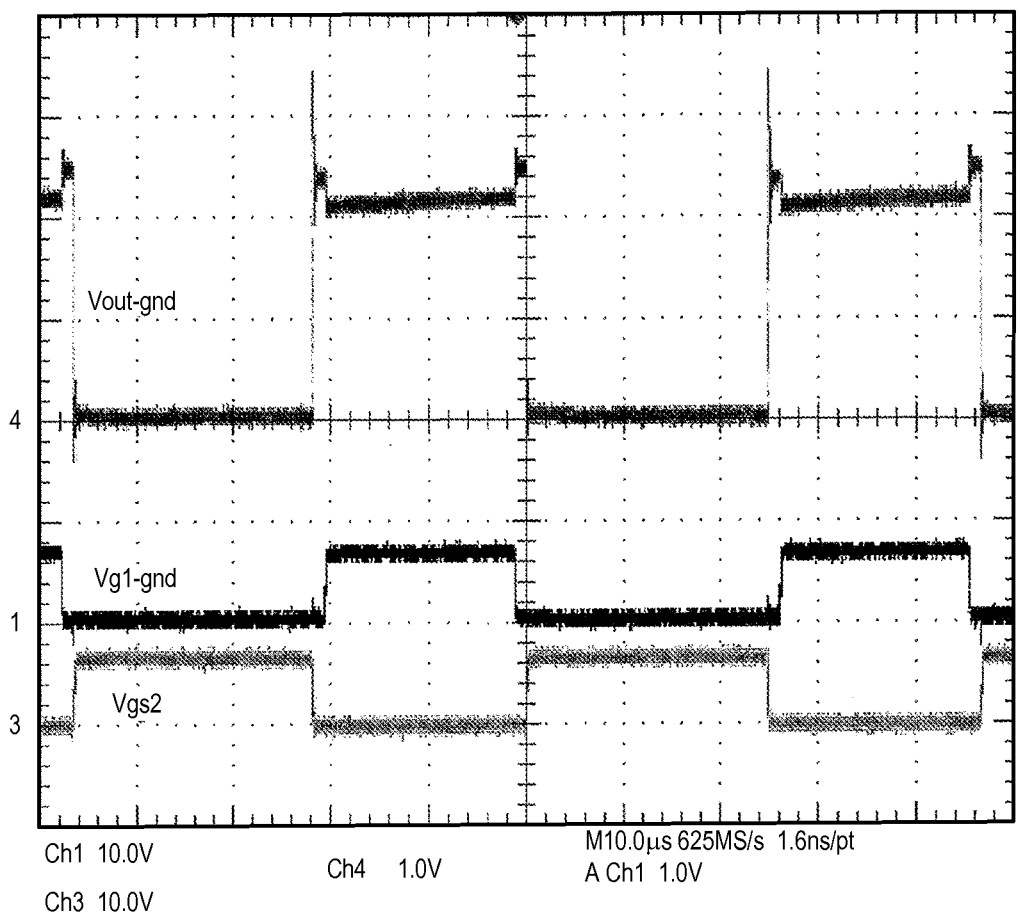
FIG. 10 is a graphical representation of a loaded 20 kHz waveforms, traces top to bottom, output terminal, bottom MOSFET gate, top MOSFET gate, all referred to ground.

The waveforms at 20 kHz without load are shown in FIG. 9. Note that the load connection is across terminals X and Y. The lower MOSFET has the higher gate drive voltage and a lower $R_{dson}$. FIG. 10 shows the loaded waveforms. Note the conduction of the MOSFET inverse diodes in the dead time as seen by the 2 µS wide peaks on the leading and trailing pulse top edges on the top trace. The transfer of current to these diodes generates an additional conduction loss of 24 mW which reduces efficiency at higher frequencies.

Given circuit losses are around a few percentage points of rating, precise voltage and current measurements are needed if power measurements are used to determine efficiency. A complication is that the output is inductorless and both the output voltage and current contain significant switching frequency components. It is likely that a significant amount of power is transferred to the combined R-L load at frequencies other than DC.

Figure 11:
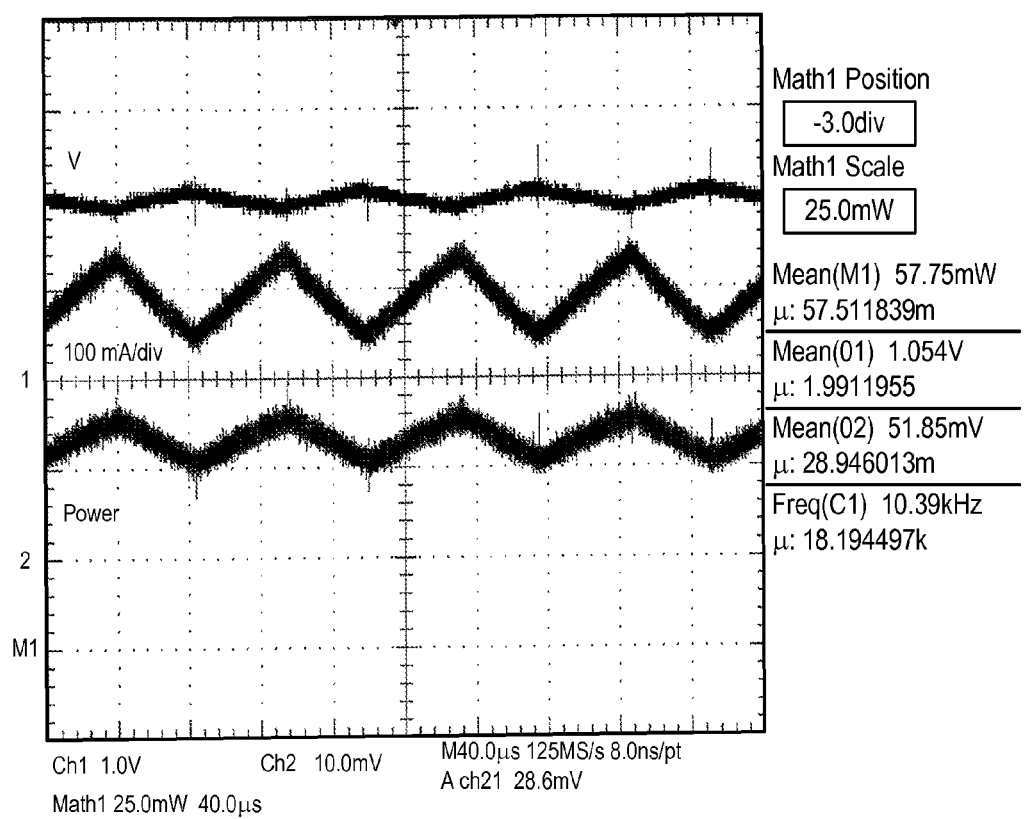
FIG. 11 is a graphical representation of input voltage, current and power at 10 kHz (from top to bottom)
Figure 12:
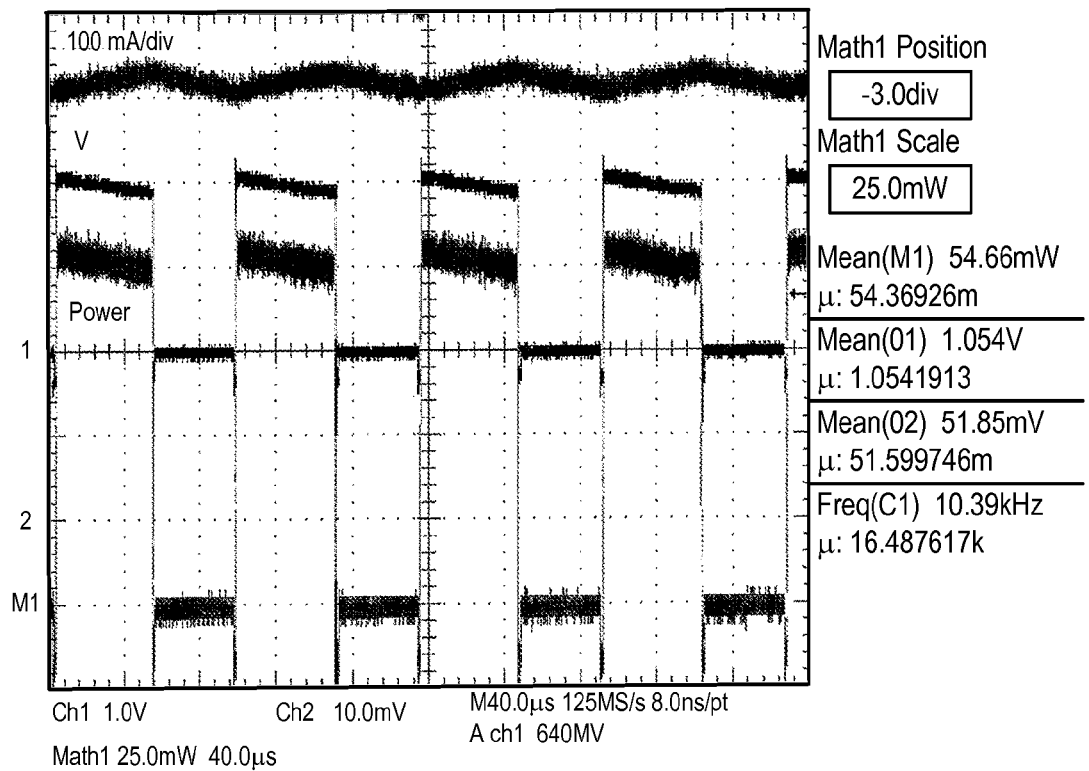
FIG. 12 is a graphical representation of output current, voltage and power at 10 kHz (from top to bottom)

In order to determine the efficiency of this converter, a new high end oscilloscope was used to measure the input and output power. The internal math function was employed to obtain the instantaneous power from the current and voltage, the mean value of which indicates the average power. The current probe was carefully calibrated before each current measurement, to minimize measurement errors. FIG. 13 shows the details of the equipment used in a table format. FIGS. 11 and 12 show the input and output voltages, current and power. The mean value of measured power is displayed at the right column of the figures.

The efficiencies of the converter obtained are shown in a table in FIG. 14. It is seen that the measured efficiency is slightly lower than estimated especially at higher frequencies. One reason is the loss during the dead-time. The on-state voltage drop of the diode is much higher than the MOSFET, and therefore reduces the efficiency of the converter. At 10 kHz the dead time loss accounts for 12 mW of the observed 30 mW. The results do confirm that the circuit is capable of achieving high efficiencies especially if the switching frequency is low.

VARIATIONS

It will of course be realized that while the foregoing has been given by way of illustrative example of this disclosure, all such and other modifications and variations thereto as would be apparent to persons skilled in the art are deemed to fall within the broad scope and ambit of this disclosure as is herein set forth.

Throughout the description and claims this specification the word "comprise" and variations of that word such as "comprises" and "comprising," are not intended to exclude other additives, components, integers or steps.

What is claimed is:

1. A solar unit, comprising:
a solar generator having at least one solar cell to generate electric power;
only one pair of output connections to provide output; and
a converter coupled between the solar generator and the only pair of output connections, wherein the converter receives direct current electricity input provided by the solar generator and provides direct current output to the pair of output connections, wherein the converter includes:
a switch,
an energy storage capacitor coupled between the solar generator and the switch, and
a controller operable to operate, via controlling the switch, the solar generator at a maximum power point independent of one or more second solar generators that are connected to the pair of output connections in a series connection;
wherein when the switch is turned on, the solar generator and the energy storage capacitor are connected in parallel and further connected in the series connection with the one or more second solar generators; and
wherein when the switch is turned off,
the solar generator and the energy storage capacitor are electronically disconnected from the series connection, and
the converter provides at least one path for the series connection.

2. The solar unit of claim 1, wherein the controller is configured to control a duty cycle of the switch to track the maximum power point of the solar generator.

3. The solar unit of claim 1, wherein the at least one path includes a diode.

4. The solar unit of claim 1, wherein the converter has no inductor.

5. The solar unit of claim 4, wherein the converter is a buck-type converter.

6. A system, comprising:
a plurality of solar units, each respective solar unit of the solar units having only one pair of output connections to provide output;
a set of wires connecting outputs of the plurality of solar units in a series connection;
wherein the respective solar unit comprises:
a solar generator having at least one solar cell to generate electric power;
a DC/DC converter coupled between the solar generator and the only pair of output connections, the DC/DC converter comprising:
a switch,
an energy storage capacitor coupled between the solar generator and the switch, and
a controller for the switch to operate the solar generator at a maximum power point independent of other solar units in the series connection;
wherein when the switch is turned on, the solar generator and the energy storage capacitor are connected in parallel and further connected in the series connection; and
wherein when the switch is turned off,
the solar generator and the energy storage capacitor are electronically disconnected from the series connection, and
the DC/DC converter provides at least one path for the series connection.

7. The system of claim 6, wherein the at least one path includes a diode.

8. The system of claim 6, wherein the DC/DC converter has no inductor.

9. The system of claim 8, wherein the DC/DC converter is a buck-type converter.

10. The system of claim 8, further comprising:
an output inductor shared by the plurality of solar units in the series connection.

11. A solar system, comprising:
a solar generator having at least one solar cell operable to generate direct current electric power;
a pair of output connections to provide direct current electric output to a series connection of solar units; and
a converter coupled between the solar generator and the pair of output connections, wherein the converter receives the direct current electric power generated by the solar generator and operable to provide the direct current electric output converted from the direct current electric power generated by the solar generator, the converter comprising:
a switch;
an energy storage capacitor coupled between the solar generator and the switch;
a controller operable to:

turn the switch on to cause the solar generator and the energy storage capacitor that are connected in parallel to be further connected in the series connection of solar units; and turn the switch off to disconnect the solar generator and the energy storage capacitor from the series connection; and at least one path for the series connection when the switch is turned off.

12. The solar system of claim 11, wherein the at least one path includes a diode.

13. The solar system of claim 11, wherein the converter has no inductor.

14. The solar system of claim 13, wherein the converter is a buck-type converter.

15. The solar system of claim 13, wherein the series connection of solar units shares an output inductor.

16. The solar system of claim 13, wherein the DC/DC converter comprises a step down converter.

17. The solar system of claim 11, wherein the controller is operable to operate, via controlling the switch, the solar generator at a maximum power point.

18. The solar system of claim 17, wherein the controller is operable to control a duty cycle of the switch to track the maximum power point of the solar generator.

19. The solar system of claim 18, wherein the controller is further configured to control the switch according to a phase shift.

20. The solar system of claim 18, wherein the controller is further configured to control the switch according to a synchronizing signal.

* * * * *